United States Patent
Root-Scimeme

(10) Patent No.: US 10,762,580 B2
(45) Date of Patent: *Sep. 1, 2020

(54) METHODS AND SYSTEMS FOR SETTING AND SENDING REMINDERS

(71) Applicant: RRS Accounting Services Inc., Laguna Hills, CA (US)

(72) Inventor: Ramona Rae Root-Scimeme, Aliso Viejo, CA (US)

(73) Assignee: RRS Accounting Services Inc., Laguna Hills, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 16/212,177

(22) Filed: Dec. 6, 2018

(65) Prior Publication Data

US 2019/0180384 A1    Jun. 13, 2019

Related U.S. Application Data

(63) Continuation of application No. 15/240,798, filed on Aug. 18, 2016, now Pat. No. 10,186,001.

(Continued)

(51) Int. Cl.
*G06Q 40/00*       (2012.01)
*G06Q 10/10*       (2012.01)
(Continued)

(52) U.S. Cl.
CPC ......... *G06Q 40/123* (2013.12); *G06F 40/174* (2020.01); *G06Q 10/1093* (2013.01); *G06Q 10/06* (2013.01)

(58) Field of Classification Search
CPC .. G06Q 40/123; G06Q 10/1093; G06Q 10/10; G06Q 40/02; G06Q 10/109;
(Continued)

(56) References Cited

U.S. PATENT DOCUMENTS 7,716,094 B1 *   5/2010   Sutter ................ G06Q 20/14
                                          705/30
8,015,083 B1 *   9/2011   Sterling ............. G06Q 20/207
                                          705/19

(Continued)

FOREIGN PATENT DOCUMENTS

EP        2474917          7/2012
JP        2016201073   *   4/2015   ............ G06Q 50/16
WO    WO-2005026864 A2 *   3/2005   ............ G06Q 10/00

OTHER PUBLICATIONS

Mukherjee, "Automating Forms Publishing with the Intelligent Filing Manager," CCH-LIS, Wolters-Kluwer US, IEEE (Year: 1999).*

(Continued)

*Primary Examiner* — Alexander G Kalinowski
*Assistant Examiner* — William B. Bunker
(74) *Attorney, Agent, or Firm* — CIONCA IP Law P.C.; Marin Cionca

(57) ABSTRACT

A computer system for generating and sending customized reminders having at least a server having a processor, operating system, memory, database and an application for generating and sending customized reminders to users comprising processor-executable instructions stored on a non-transitory processor-readable medium that when executed by the processor enables the computer system to perform operations.

16 Claims, 7 Drawing Sheets

Related U.S. Application Data

(60) Provisional application No. 62/206,717, filed on Aug. 18, 2015.

(51) Int. Cl.
*G06F 40/174* (2020.01)
*G06Q 10/06* (2012.01)

(58) Field of Classification Search
CPC ........ G06Q 30/02; G06Q 30/06; G06Q 10/06; G06Q 20/10; G06F 17/243
See application file for complete search history.

(56) References Cited

U.S. PATENT DOCUMENTS

| | | | | |
|---|---|---|---|---|
| 2003/0216978 | A1* | 11/2003 | Sweeney | G06Q 40/12 |
| | | | | 705/30 |
| 2003/0217032 | A1* | 11/2003 | Fritzler | G06Q 10/10 |
| 2004/0205533 | A1* | 10/2004 | Lopata | G06F 40/174 |
| | | | | 715/226 |
| 2006/0085306 | A1* | 4/2006 | Schulte | G06Q 40/02 |
| | | | | 705/31 |
| 2007/0244976 | A1* | 10/2007 | Carroll | G06Q 10/107 |
| | | | | 709/206 |
| 2007/0250784 | A1* | 10/2007 | Riley | G06Q 10/10 |
| | | | | 715/764 |
| 2009/0089195 | A1* | 4/2009 | Salomon | G06Q 40/00 |
| | | | | 705/35 |
| 2014/0180883 | A1* | 6/2014 | Regan | G06Q 40/123 |
| | | | | 705/31 |
| 2015/0188876 | A1* | 7/2015 | Jackson | H04L 51/02 |
| | | | | 709/206 |
| 2016/0180294 | A1* | 6/2016 | Simon | G06Q 10/1057 |
| | | | | 705/322 |
| 2017/0192949 | A1* | 7/2017 | Gaither | G06F 40/174 |
| 2017/0193412 | A1* | 7/2017 | Easton | G06Q 10/06313 |

OTHER PUBLICATIONS

Anonymous, "How to File an Annual Report," www.legalzoom.com/articles/how-to-file-an-annual-report (Year: 2015).*

Anonymous, "State by State Review of ongoing Filing Requirements," web.archive.org/web/20160501234954/https://www/incfile.com/compliance-filing-requirement/ (Year: 2016).*

Wei-Dong Zhu, Eric Adel, William Benjamin, Imtiaz A. Khan, Mike Marin, Mark Yingling, "Introducing IBM FileNet Business Process Manager," IBM Redbook Form Number: SG24-7509-00, Aug. 29, 2008.

"Dynamic Schedule Generator," The IP.com Prior Art Database, IP.com Disclosure No. IPCOM000241201D, Apr. 2, 2015.

* cited by examiner

METHODS AND SYSTEMS FOR SETTING AND SENDING REMINDERS

CROSS-REFERENCE TO RELATED APPLICATIONS

This application is a continuation and claims the benefit of U.S. Non-Provisional application Ser. No. 15/240,798, filed Aug. 18, 2016, which claims the benefit of U.S. Provisional Application No. 62/206,717, filed Aug. 18, 2015, which are hereby incorporated by reference, to the extent that they are not conflicting with the present application.

BACKGROUND OF INVENTION

1. Field of the Invention

The invention relates generally to automatic web-based reminders and more specifically to reminders for filing annual forms and taxes.

2. Description of the Related Art

Many business owners must annually file certain forms, fees, or taxes relating to their business. There may be penalties for non-filing or late filing. To avoid these penalties, planning and preparation for the filing must be done ahead of time, and some people may forget to do so. Some users may also not be aware of all required forms, fees, or taxes. Improper, late, or missed submission of necessary forms may be costly for business owners and other people who may be required to submit government forms. Thus, there is a need for business owners or other individuals (hereinafter "user") to have a convenient reminder system including instructions for their form, fee, or tax filings.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect a computer system is provided wherein a user may subscribe to a service for setting and sending reminders for government forms, such that deadlines are not missed and penalties are avoided. Thus, an advantage is a schedule of reminders is automated for the user and instructions are sent to the user along with the due form, and the user is enabled to avoid missing deadlines and penalties.

In another aspect, a user may receive email notification of an upcoming due date and download of a form or link to an online form with related instructions to an online calendar 1 month prior, 2 weeks prior, and 1 day prior to the due date of filing. Thus, an advantage is that a user may receive several reminders with enough notice to prepare their filing. Another advantage is that instructions may clear up any confusion the user may have had about what forms, fees, or taxes are necessary for filing.

In another aspect, a due date is determined by the service according to a user-provided business formation date. In another exemplary embodiment, the user may select their corporate business entity type, and reminders will be sent according to the government agency forms and fees required for their specific type. The forms may, for example, include forms from the agencies of the IRS, California Franchise Tax Board, and California Secretary of State, or any other U.S. State Agencies. The business entity types may, for example, include S Corporation, LLC Partnership, and LLC Single Member. Thus, an advantage is that the reminders are customized for each user.

In another aspect, the user may receive at least one reminder. In another aspect, the reminder of the due date may be integrated with the user's online calendar. Thus, an advantage is that that the filing process is more convenient for the user.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
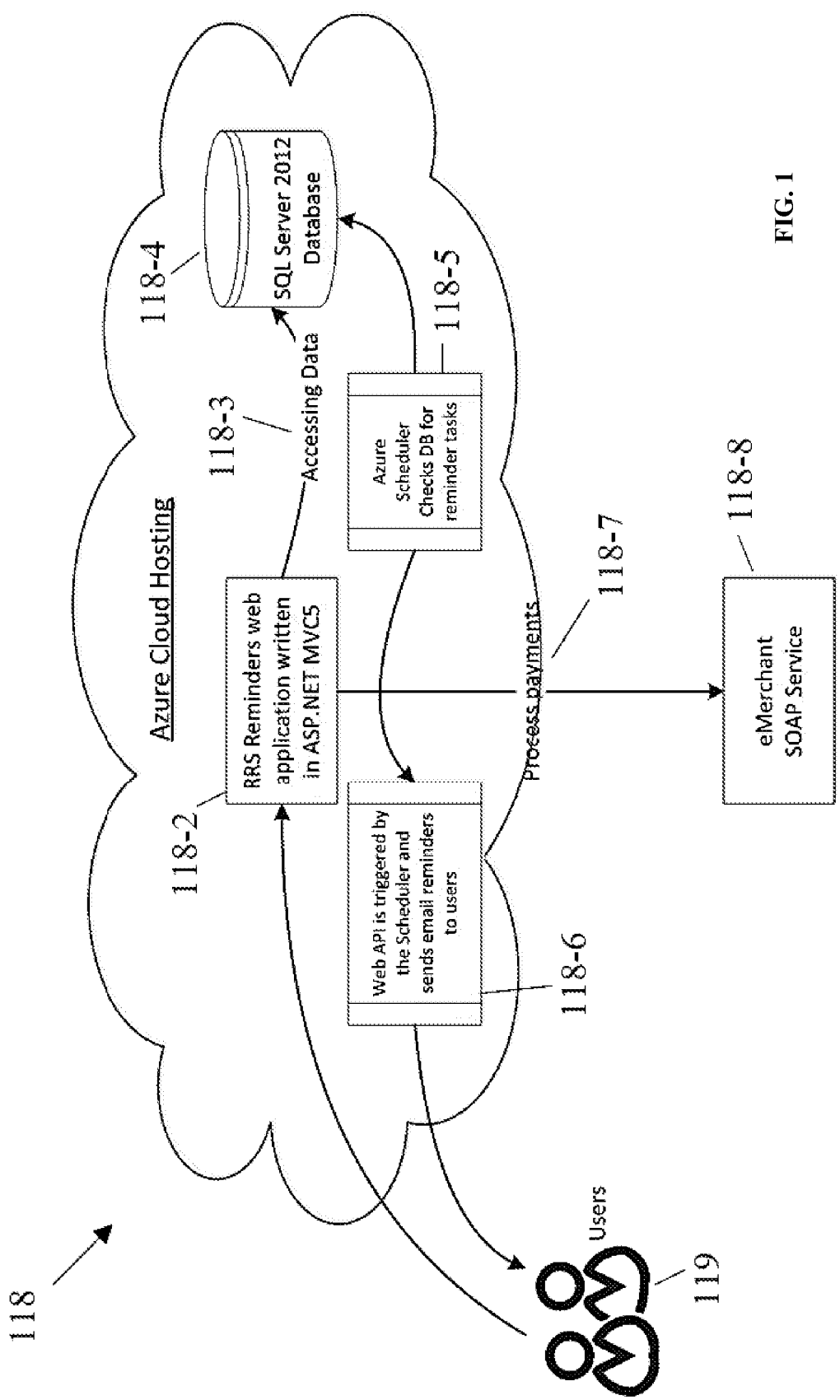
FIG. 1 illustrates a diagrammatic view of a computer system for setting and sending reminders, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

As used herein and throughout this disclosure, the term "mobile device" refers to any electronic device capable of communicating across a mobile network. A mobile device may have a processor, a memory, a transceiver, an input, and an output. Examples of such devices include cellular telephones, smartphones, tablets, portable computers, etc. The memory stores applications, software, or logic. Examples of processors are computer processors (processing units), microprocessors, digital signal processors, controllers and microcontrollers, etc. A transceiver includes but is not limited to cellular, GPRS, Bluetooth, and Wi-Fi transceivers.

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Mobile devices communicate with each other and with other elements via a network, for instance, a cellular network. A "network" can include broadband wide-area networks, local-area networks, and personal area networks. Communication across a network can be packet-based or use radio and frequency/amplitude modulations using appropriate analog-digital-analog converters and other elements. Examples of radio networks include GSM, CDMA, Wi-Fi and BLUETOOTH® networks, with communication being enabled by transceivers. A network typically includes a plurality of elements such as servers that host logic for performing tasks on the network. Servers may be placed at several logical points on the network. Servers may further be in communication with databases and can enable communication devices to access the contents of a database. For instance, an authentication server hosts or is in communication with a database having authentication information for users of a mobile network. A "user account" may include several attributes for a particular user, including a unique identifier of the mobile device(s) owned by the user, relationships with other users, call data records, bank account information, etc. A billing server may host a user account for the user to which value is added or removed based on the user's usage of services. One of these services includes mobile payment. In exemplary mobile payment systems, a user account hosted at a billing server is debited or credited based upon transactions performed by a user using their mobile device as a payment method.

For the following description, it can be assumed that most correspondingly labeled elements across the figures (e.g., 118-4 and 218-4, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates a diagrammatic view of a computer system 118 for setting and sending reminders ("computer system," "computer system for sending reminders," "system for sending reminders," also called for example "RRS Reminders"), according to an aspect. The computer technology described herein may be a service that a user 119 may subscribe to, in order to use the system. In an example of implementation, the computer technology described herein can be implemented as a software as a service (SaaS). As an example, the system 118 for sending reminders may be a web application written in ASP.NET MVC5, for example.

Users 119 of the system 118 may first sign up for the service to use the system (step 118-2). A user who owns or is part of a business or company with periodic needs to submitting tax or other types of government forms may be provided with reminders by the system to submit the forms. When a user 119 signs up for the service, the user's data may be accessed (step 118-3) and stored in a backend database (step 118-4), which may be, for example, powered by SQL Server 2012. A cloud service such as Azure Scheduler may be used to perform frequent checks in the database (step 118-5). Next, a web API may be triggered by Azure Scheduler or another similar service, when a reminder is needed, and a reminder may be sent to the user 119 (step 118-6). The reminder may be in the form of an email, text message, or any other similar alert or electronic message. The schedule of reminders may also be customized. As shown, the system 118 may include a server, which may be connected to a network, such as the internet. As an example, Azure cloud hosting may be used to host the service.

Customers may pay the administrator or other provider for use of the service for setting and sending reminders. The administrator or provider may use, for example, eMarchant SOAP service to process payments (step 118-7), or any other suitable service. As an example, when a customer subscribes to the service, the application may call eMerchant to process the customer's payment (step 118-8). The customer's information may then be saved by eMerchant. If a customer cancels their subscription, the application may call eMerchant to delete the saved customer information. If at this or a later time a refund is needed to be processed for a customer, the application may call the eMerchant service to refund any necessary charge to the customer.

Figure 2:
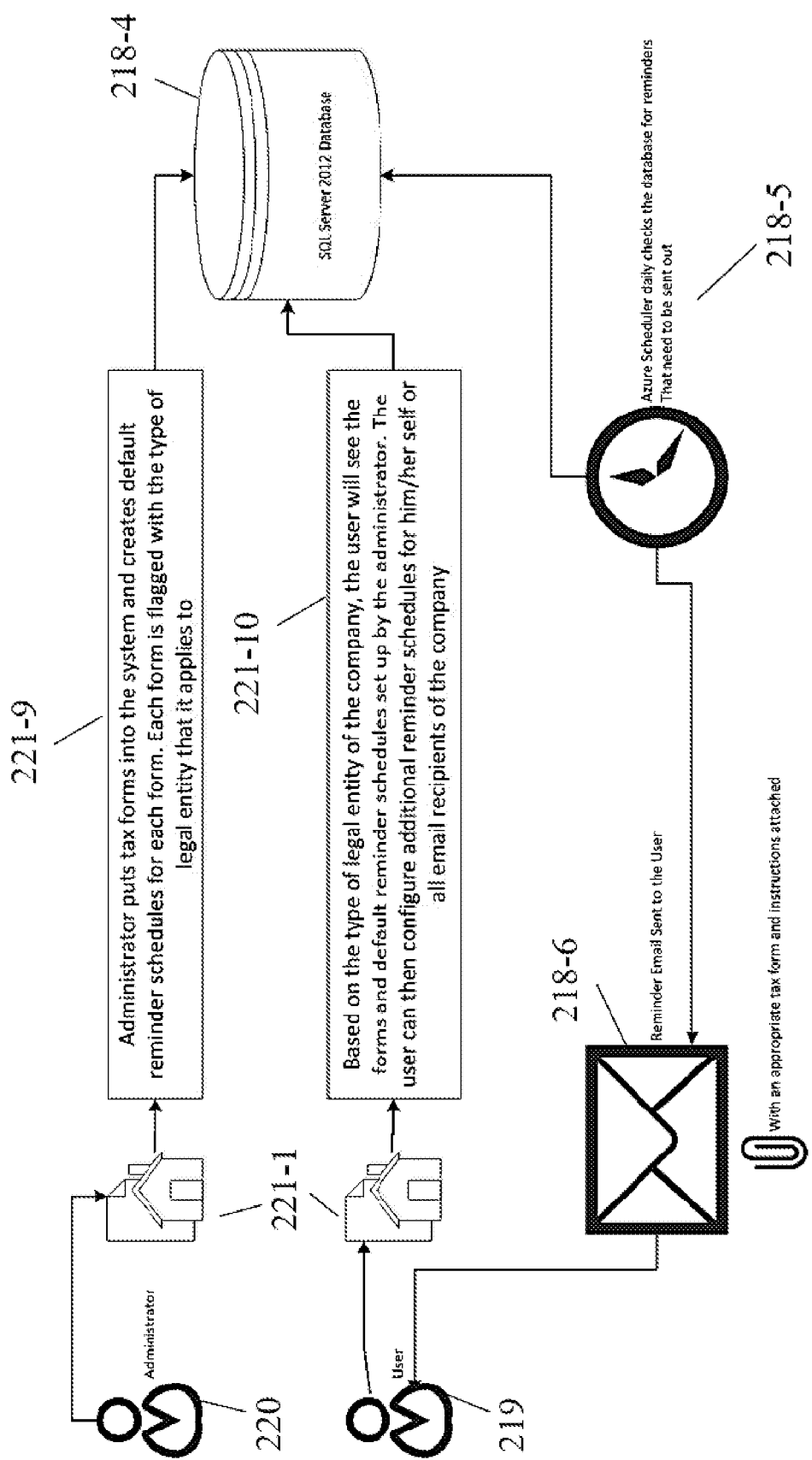
FIG. 2 illustrates a diagrammatic view of the administrator's and the user's experiences while using the computer system for sending reminders, according to an aspect.

FIG. 2 illustrates a diagrammatic view of the administrator's 220 and the user's 219 experiences while using the computer system 118 for sending reminders, according to an aspect. An administrator 220 may login to use the service (step 221-1). The administrator 220 may load various tax forms into the computer system and create default reminder schedules for each type of tax form loaded. Each type of tax form may be flagged with the type of legal entity that it applies to, and which government entity to which it is associated or must be submitted to. The tax forms and corresponding reminder schedules may be stored in the database (step 218-4).

The user 219 may login to use the service (step 221-1). The user 219 may specify which type of legal entity their company is, and based upon their answer, may see the appropriate tax forms and corresponding default reminder schedules set up by the administrator 220. Again, a user may be designated as a certain type of business or company type, and may therefore have different tax or government forms associated with their business or company type. As an example, an S Corporation business many need to submit forms to the Internal Revenue Service (IRS). The system may determine which forms the user needs to submit, based upon their business or company type. The user 219 may have their information, such as the company type, stored on the database 218-4.

A service such as Azure Scheduler or any other suitable service may check the database periodically (step 218-5). As an example, the service may check the database once daily for reminders that need to be set out. If any are scheduled to be sent, a reminder may be sent to the user 219 (step 218-6), preferably in the form of an email. The email may contain the necessary tax forms as an attachment.

Figure 3:
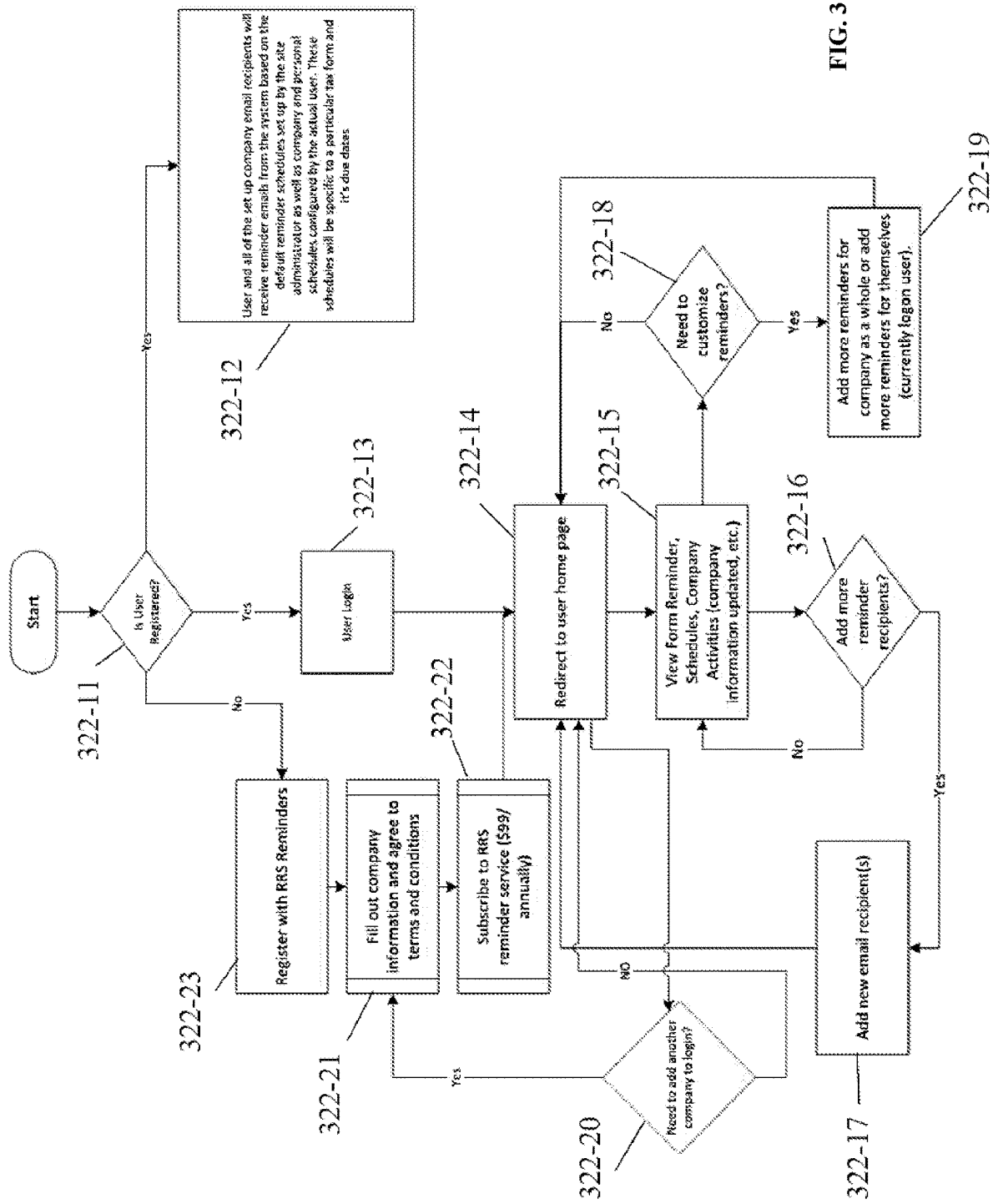
FIG. 3 illustrates a flow chart depicting the exemplary steps of the user's experience while using the system for sending reminders, according to an aspect.

FIG. 3 illustrates a flow chart depicting the exemplary steps of the user's experience while using the system for sending reminders, according to an aspect. The system first may detect whether or not the user is registered with the service (step 322-11). If yes, the user and any other members of the user's company who are set to receive reminder emails and/or are associated with the user may receive reminders based on the system's default reminder schedules (step 322-12), as will be discussed in more detail in FIG. 5.

If the system recognizes the user as registered (step 322-11), the user may then login (step 322-13), and upon doing so, may be redirected to the user home page (step 322-14). From the user home page, the user may view a number of different items (step 322-15), such as, for example, a form reminder, schedules, a list of company activities (such as updates to the company information, etc.). The user may be asked whether they wish to add more reminder recipients (step 322-16). If no, the user may be brought back to the items viewable on the home page (step 322-15). If yes, the user may add new email reminder recipients (step 322-17). After completion of this step, the user may be brought back to the user home page (step 322-14).

The user may also have other options available to them upon logging in. As an example, the user may be asked whether there is a need to customize their reminders (step 322-18). If no, the user may be redirected to the user home page (step 322-14). If yes, the user may add more reminders for the company as a whole, or may add reminders for only themselves, which may be the currently logged in user (step 322-19). After completing this task, the user may again be redirected to the user home page (step 322-14).

While on the user home page (step 322-14), the user may have the option of adding another company to their login identification (step 322-20). The user may then submit the new company's information (step 322-21). This may be done by answering questions and/or filling out a form, and agreeing to the service's terms and conditions. Next, the user may subscribe to the service (step 322-22). As an example, the user may subscribe by paying a fee, which may be annual, monthly, or any other suitable recurring fee. The user may then be redirected to the user home page as a logged in user (step 322-14).

If the system detects that the user is not registered, the user may be given the option to register with the service (step 322-23). Next, the user may submit their company information (step 322-21). Again, this may be done by answering questions and/or filling out a form, and agreeing to the service's terms and conditions. Again, the user may next subscribe to the service (step 322-22). As an example, the user may subscribe by paying a fee, which may be annual, monthly, or any other suitable recurring fee. The user may then be redirected to the user home page as a logged in user (step 322-14).

Figure 4:
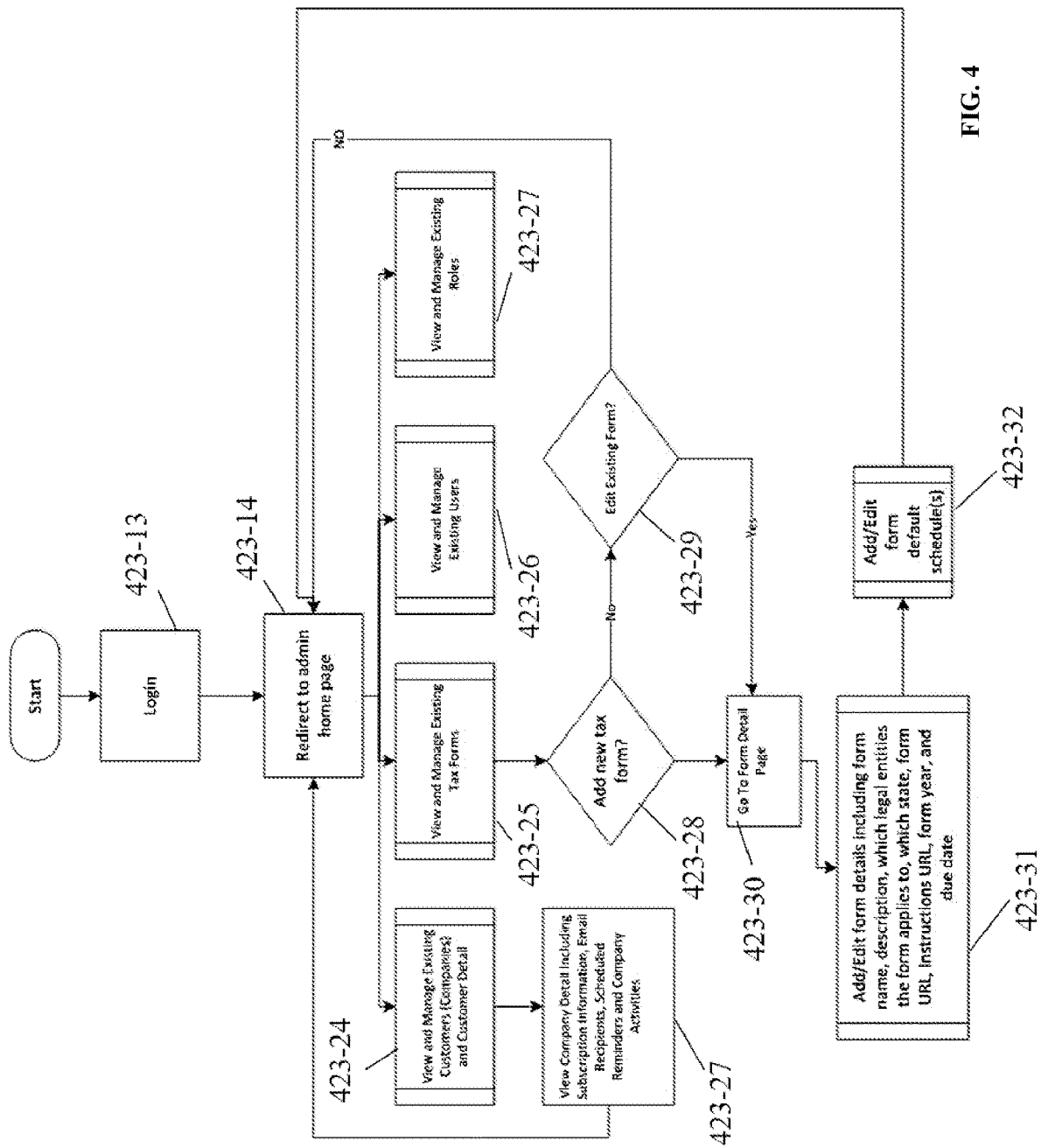
FIG. 4 illustrates a flow chart depicting the exemplary steps of the administrator's experience while using the system for sending reminders, according to an aspect.

FIG. 4 illustrates a flow chart depicting the exemplary steps of the administrator's experience while using the system for sending reminders, according to an aspect. First, the administrator may login to the system (step 423-13), and upon logging in, may be redirected to the administrator home page (step 423-14). From the administrator home page, the administrator may have several options. As examples, the administrator may be able to view and manage existing customers (companies), and the details of each customer (step 423-24), view and manage existing tax and government forms (step 423-25), view and manage existing users (step 423-26), and view and manage existing roles (step 423-27). As an example, the system may have by default two initial roles, a user 219 and an administrator 220, and the administrator 220 may have the ability to create additional roles, such as, for example, an "accountant" role. Based on a newly created role, the system may at some point have logic to assign new business rules and abilities to that role. Additional subscription fees may or may not apply in such a case.

When viewing the detailed information of any one company (step 423-24), the administrator may have access to a company profile, which may include the company's subscription information, email recipients, scheduled reminders, and company activities (step 423-28). When viewing and managing existing tax forms (423-25), the administrator may be prompted whether a new tax form is to be added (step 423-28). If yes, the administrator may be taken to a form detail page (step 423-30), wherein the administrator may add or edit form details (step 423-31) such as, for example, the form name, description, which legal entities and state to which the form applies, a link to a webpage with instructions for the form, the form year, and form due date. After completing the form details, the administrator may add or edit the default schedule corresponding to the form (step 423-32), and next may be redirected to the administrator home page (step 423-14).

If in response to the prompt, the administrator chooses not to add a new tax form, an option may be given to edit existing forms (step 423-29). If yes, the administrator may be taken to a form detail page (step 423-30). The administrator may then edit details (step 423-31) such as, for example, the form name, description, which legal entities and state to which the form applies, a link to a webpage with instructions for the form, the form year, and form due date. Completion of editing may then redirect the administrator back to the administrator home page (step 423-14). If existing forms do not need to be edited, the administrator may be redirected to the administrator home page (step 423-14).

Figure 5:
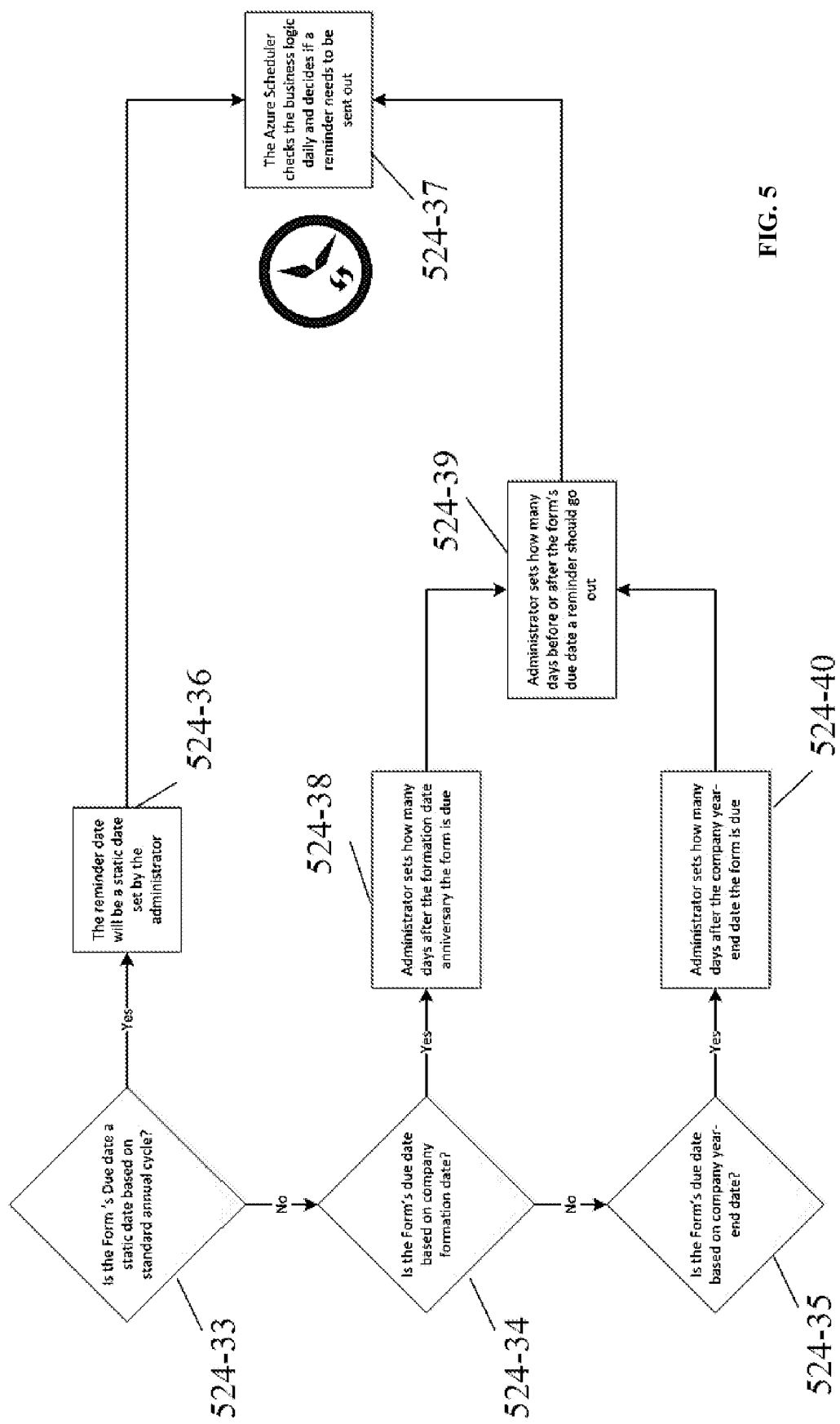
FIG. 5 illustrates a flow chart depicting an example of how due dates may be applied to various forms in the computer system for sending reminders, according to an aspect.

FIG. 5 illustrates a flow chart depicting an example of how due dates may be applied to various forms in the computer system for sending reminders, according to an aspect. The computer technology implemented in the system may follow these steps for each different form stored in the database. First, the computer system may determine whether a form's due date is a static date based upon a standard annual cycle (step 524-33). If yes, the reminder may then be a static date or default date that may be set by the administrator (step 524-36). Azure Scheduler or any other suitable platform may be used to check the business logic whether a reminder needs to be sent (step 524-37). The check may be performed daily, for example, or the administrator may also set a different period of time for checks.

If the form due date is not a static date based on a standard annual cycle, the system may next check whether the form's due date is based on the company's formation date (step 524-34). If yes, the administrator may set the number of days after the company's formation date the form is due (step 524-38). Next, the administrator may set how many days before or after the form's due date a reminder is to be sent out (step 524-39), or may set any other default reminder date. Azure Scheduler or any other suitable platform may then be used to check the business logic whether a reminder needs to be sent (step 524-37). Again, this check may be performed daily, for example, or the administrator may also set a different period of time for checks.

If a form's due date is not based on company formation date, the system may next determine whether the form's due date is based on company year-end date (step 524-35). If yes, the administrator may set how many days after the company year-end date the form is due (step 524-40), or may set any other default reminder date. Next, the administrator may set how many days before or after the form's due date a reminder is to be sent out (step 524-39). Again, Azure Scheduler or any other suitable platform may then be used to check the business logic whether a reminder needs to be sent (step 524-37). Again, this check may be performed daily, for example, or the administrator may also set a different period of time for checks.

Figure 6:
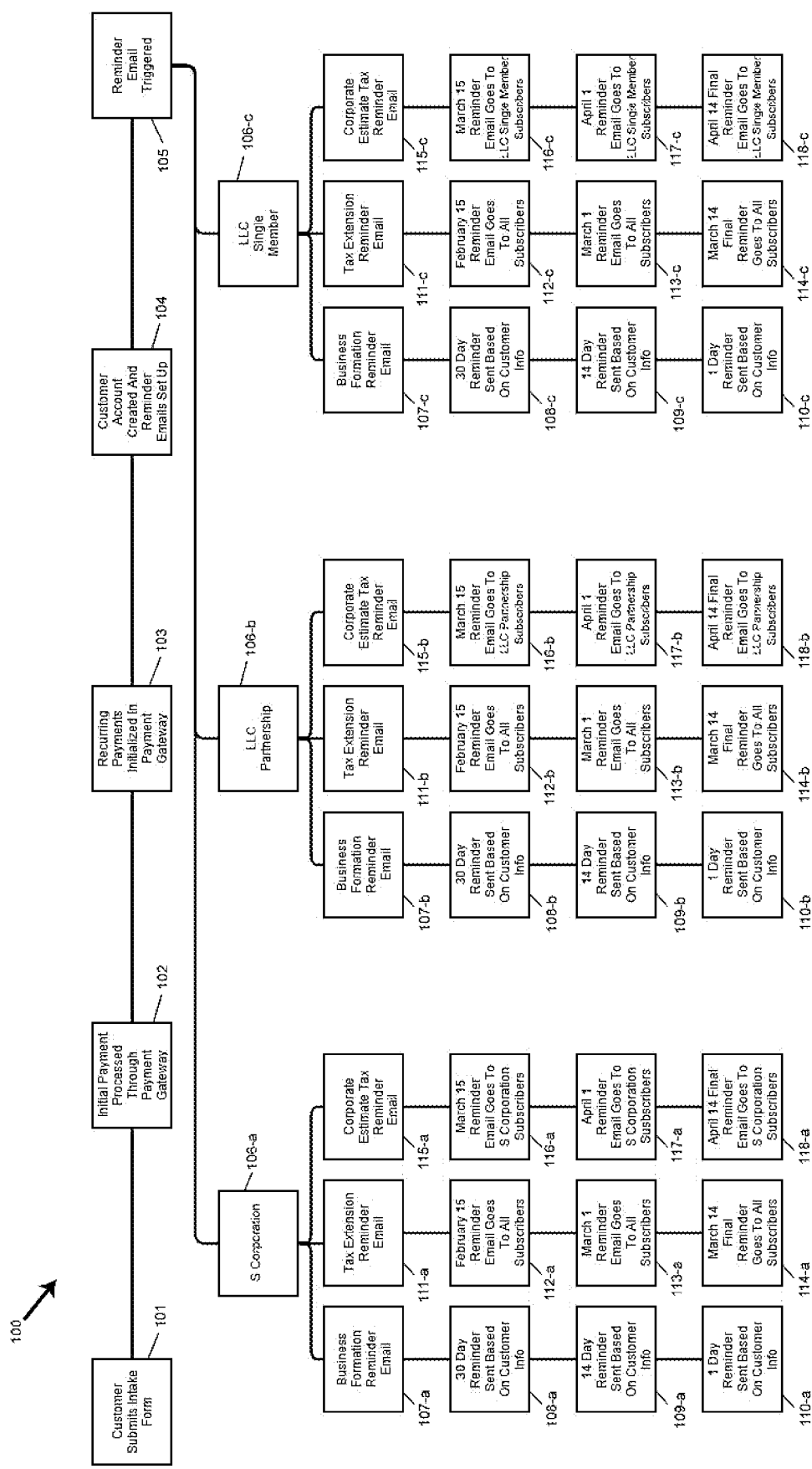
FIG. 6 illustrates a flow chart of an alternative embodiment of a process for setting and sending reminders, according to an aspect.

FIG. 6 illustrates a flow chart of an alternative embodiment of a process 100 for setting and sending reminders, according to an aspect. The process 100 may be implemented on a web-based platform for reminders emailed to users based on the user's type of business. A web-based platform may include one or more servers and computers connected to the Internet. A user may submit their information into an intake form (step 101) on a website, which may be used by a company offering the reminder service. The information needed from the user may include, for example, business name and address, contact information, business formation date, business year end date, and payment information. An initial payment from the user may be processed through a payment gateway (step 102). Recurring payments may be set up at this time (step 103). The account for the user may then be set up (step 104). A notification may be sent to the service provider that a transaction has been approved, and a notification email may be sent to the customer and service provider or administrator (not shown).

The service software implementing process 100 may be configured to determine which forms at which dates are needed by the user according to their corporate business entity type, such as, for example, S Corporation, LLC Partnership, or LLC Single Member. The user may then receive reminder emails from the service provider as per, for example, the IRS or Secretary of State Office requirements for their specific corporate business entity type, triggered by a due date (step 105).

As shown, a user may select for example S Corporation as their business type (step 106-*a*). For an S Corporation, a user may receive a Business Formation Reminder Email (step 107-*a*), for Form SI-200 (Statement of Information Form). The first Business Formation Reminder Email may be triggered and sent 30 days prior to the due date (step 108-*a*), which preferably is based upon the business formation date as entered on the initial subscriber intake form. Each business may have a unique date which is predicated upon their own business formation date. The appropriate Secretary of State form may be accessed online through the Secretary of State portal and the reminder service may provide a direct link to the form and/or an email attachment of the form itself within the reminder email (step 108-*a*). The reminder email may include instructions for completing and filing the form, and the instructions may, for example, include notice of fees required, or instructions for mailing the form. Since the IRS may change the URL for the form on an annual basis, an advantage is that the user may receive an updated direct link with each reminder as well as the actual form as an attachment within the reminder email.

A second Business Formation Reminder Email may be sent 14 days prior to the due date (step 109-*a*). The same links and instructions as in the first email (step 108-*a*) may be included, with an updated message alerting the user that there are two weeks until the deadline, and a message that penalties, which may include a late fee, may be incurred if the filing is late. A third Business Formation Reminder Email may be sent one day prior to the due date (step 110-*a*). The same links and instructions as in the first email (step 108-*a*) may be included, with an updated message alerting the user that there is one day until the deadline and a message that penalties, which may include a late fee, may be incurred if the filing is late.

An S Corporation user may also receive additional reminder emails. For example, a Tax Extension Reminder Email (step 111-*a*) may be sent, including a link to IRS Form 7004, the Automatic Extension of time to file form. This reminder email may include a message prompting users that if they do not think they can file their 1120 S (US Income Tax Return for S Corporation) on time, they may complete and file the IRS Form 7004 through the government portal.

An S Corporation user may also receive State Business Income Tax Extension Reminder Emails (also shown as step 111-*a*), for Form 3539. The message included with these reminders may be, for example, that if the user paid their Corporate Estimate Tax last year, then this form will not need to be filled out at this time, but if the user did not pay the fee by April 15 of the previous year, then the user will need to fill out the form and submit it to avoid fines and penalty.

The reminder emails for Form 7004 and Form 3539 may be sent together in a single reminder email. Each reminder email may include a link to the appropriate form(s), instructions for completing and filing the form(s), and the due date of March 15, which may be in 30 days on February 15 (step 112-*a*), in 2 weeks on March 1 (step 113-*a*), or in 1 day on March 14 (step 114-*a*).

An S Corporation user may receive Corporate Estimate Tax Reminder Emails (step 115-*a*), for Form 100-ES. As an example, all S Corporations within the state of California may pay a designated minimum franchise tax fee, for example, $800. Again, three reminder emails may be sent to the user (steps 116-*a*-118-*a*). Again, each reminder email may include a link to the appropriate form, instructions for completing and filing the form, and the due date of April 15, which may be in 30 days on March 15 (step 116-*a*), in 2 weeks on April 1 (step 117-*a*), or in 1 day on April 14 (step 118-*a*).

A user may select LLC Partnership as their business type (step 106-*b*), and receive the same reminder emails as S Corporations with the addition of reminder emails for one more form, the Form 3536, such that an LLC Partnership user may receive reminder emails for five forms. LLC Partnership users may receive three Business Formation Reminder Emails (step 107-*b*) with a link to the Secretary of State form, Form LLC-12, similar to the form required for S Corporations, and instructions as described herein for S Corporations, on the three trigger due dates (steps 108-*b*-110-*b*). Again, the dates that the reminder emails are sent may be dependent on the business formation date provided by the user. The instructions may, for example, include a statement of what fees are required, and may include notice that the form may not be completed online and must be mailed.

An LLC Partnership user may receive three Tax Extension Reminder Emails (step 111-*b*) with a link to the Form 7004 and instructions and State Business Income Tax Extension Reminder Emails (also shown as step 111-*b*) as described herein for S Corporations, on the three trigger dates (steps 112-*b*-114-*b*) according to the due date of March 15. LLC Partnership users may also receive Corporate Estimate Tax Reminder Emails (step 115-*b*), for LLC Form 3522 on three trigger dates, triggered by a due date of April 15 (steps 116-*b*-118-*b*). Again as an example, as in the reminder emails for S Corporations, this reminder email may include a message regarding the minimum franchise tax fee payable by, for example, all LLC corporations within the state of California. LLC Partnership users may also receive reminder emails for Form 3536 (not shown) due on June 15. Three reminder emails including a link to the form and instructions for completing and filing the form may be sent 30 days prior to the due date on May 15, 2 weeks prior on June 1, and 1 day prior on June 15 (not shown).

A user may select LLC Single Member as their business type (step 106-*c*). LLC Single Member users may receive reminder emails for three forms. Business Formation Reminder Emails (step 107-*c*) triggered by the business formation date (steps 108-*c*-110-*c*), Tax Extension Reminder Emails (step 111-*c*) triggered by a due date of March 15 (steps 112-*c*-114-*c*), and Corporate Estimate Tax Reminder Emails (step 115-*c*) triggered by a due date of April 15 (steps 115-*c*-118-*c*) may be received including messages and instructions as described herein for S Corporation users and LLC Partnership users.

In an exemplary embodiment, the contents of the reminder emails may be integrated with a user's online calendar, such as, for example, Microsoft Outlook. The reminder may be automatically generated or populated onto the calendar of the user. The due dates for filing of the forms may be, for example, automatically inserted into the user's calendar, and links to the forms may also be available through the user's calendar. As another example, the reminder email may include an option for the user to click to add the due date to their online calendar.

Figure 7:
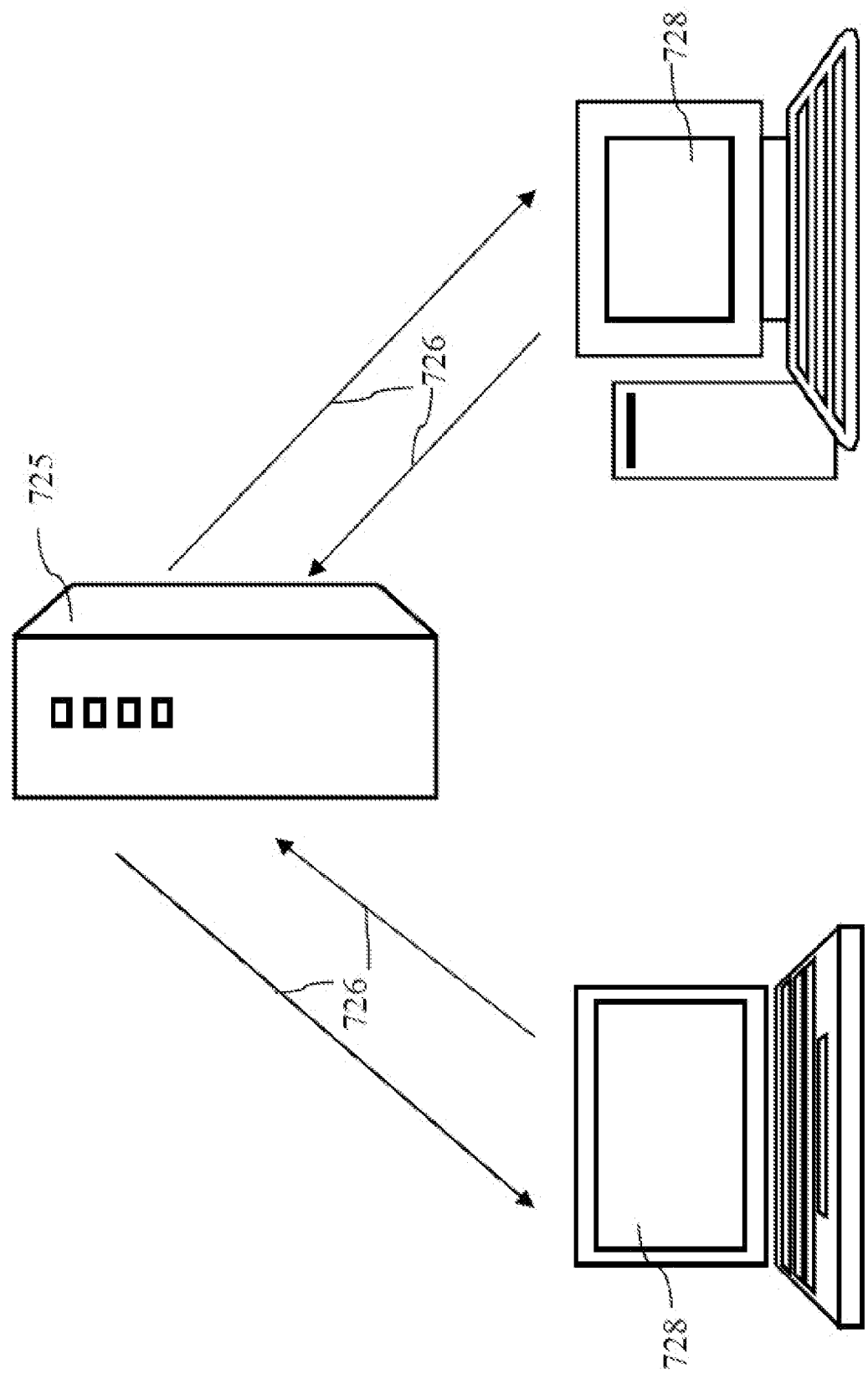
FIG. 7 illustrates an example of a computer system or web platform that can be used for providing the service for setting and sending reminders, according to an aspect.

FIG. 7 illustrates an example of a computer system or web platform that can be used for providing the service for setting and sending reminders, according to an aspect. As shown, the system may include a web application, a database (e.g., SQL Server 2012), an end user device ("client device," or "client computer") 728 capable of two-way communication 726 with a server 725 or database over a network (e.g., the internet). A web application through which a user may access the system for setting and sending reminders may run on a web server(s) or in the cloud, and may communicate with the end user device. As it will be understood, the server used in the computer system may have a processor, operating system, memory, and so on, as is commonly known. Each client computer 728 that may access the server may also have a processor, operating system, memory, and so on, as is commonly known. A client device 728 may be a laptop, mobile device, tablet, or any other personal device, which may also have a processor, memory, operating system, and so on, including non-transitory readable media, as is well known. The client computer 728 may login to the server to be provided with the service, as the system was set to do and described herein. The system may also include processor-executable instructions stored on, for example, a non-transitory processor-readable medium, that when executed by the processor, may enable the computer system to perform operations for carrying out the steps described herein.

As an example, Entity Framework may be used for accessing the database, which may allow for querying data, updating data, and inserting data to the database. Any suitable plugins and/or technologies may be used for building the front-end of the website from which the service for setting and sending reminders may be accessed. As examples: AngularJS may be used on several pages for displaying data on a grid and allowing users to quickly search for data; Bootstrap may be used for making the pages of the website responsive to the user's device (such as, for example, automatically adjusting to a desktop version, or a mobile version) and for applying layout controls on the web pages (such as, for example, using Bootstrap styles for buttons, text boxes, navigation menus, etc.); Font Awesome may be used for visual appeal on the web pages; Gentelella may be used to build an admin template for the web application of the service (such as, for example, the layout of the administrator page and user page after an administrator or user logs in); and PaceJS may be used to generate a progress indicator for users to see the loading progress of the current page.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/ or examples. Hence, the scope of the invention is defined by the accompanying claims and their equivalents. Further, each and every claim is incorporated as further disclosure into the specification.

What is claimed is:

1. A computer system for generating and sending customized reminders about and for facilitating the timely filing of government forms by a legal entity with a government entity, the computer system comprising:
    a database server that includes a database configured to store government form data, wherein the database comprises a first administrative data structure accessible only by an administrator and a second user data structure accessible by the administrator and a user;
    wherein the first administrative data structure comprises a first portion having updated government form data, the government form data comprising:
        an indication of a form type or name for a plurality of government forms;
        a first URL to each of the government forms for accessing the official, continually updated version of each of the government forms, the first URL being stored in the database in association with the corresponding type of legal entity required to submit each of the government forms, a due date for submitting each form, and default reminder dates for preparing and submitting each form;
        a second URL to the official, continually updated instructions for completing each of the government forms, the second URL being stored in the database in association with the first URL, wherein the government forms comprise tax-based forms and entity-based forms relating to reporting and filing requirements for legal entities based on the type of legal entity and the state of formation, wherein the due dates for submitting each of the government forms are caused to be stored in the database in association with at least one of a tax year-end date of a legal entity, a formation date of a legal entity, and a formation state of a legal entity;
    wherein the second user data structure comprises a second portion comprising user profile data supplied by the user, wherein the user profile data comprises an indication of the type of legal entity of the user, the formation date of the legal entity, or the tax year-end date of the legal entity;
    a first software module that has a data connection to the database server, and that:
        for a particular user, automatically and periodically checks the first and second portions of the database for due dates relating to the government form data and the user profile data;
        determines, based on the checking, whether reminders have to be sent out, by associating government form due dates and default reminder dates in the first data structure with the type of legal entity of that user in the second data structure;
        automatically triggers the sending of reminders to the user, if any reminders have to be sent out; and
        associates the first URL and the second URL with the government form which is the subject of any reminders that have to be sent out;
    a second software module that has a data connection to the first software module and that, when triggered by the first software module, automatically:
        sends an electronic message to the user, the electronic message including the reminder specific to the user;
        wherein the electronic message automatically causes the population of a calendar entry in an electronic calendar of the user residing on a remote computer with the filing due date and with the first URL for the government form and the second URL for the government form's instructions;
    an application server having a data connection to the database server and having a processor, a memory, an operating system and a third software module, the third software module comprising processor-executable instructions stored on a non-transitory processor readable medium that when executed by the processor enables the computer system to perform operations comprising:
        receiving the government form data from the administrator;
        storing the government form data in the first administrative data structure;
        automatically downloading and storing the government form from the first URL and the instructions for the government form from the second URL;
        if the government form's filing due date is static, storing the static default reminder date;
        receiving user profile data from the user about the legal entity type, the formation date, formation state or the tax year-end date of the legal entity; and
        storing the user profile data in the second user data structure.

2. The computer system of claim 1, the operations of which further comprising displaying to the user the government form data, the static default reminder date, and data about the formation date default reminder and the tax year-end date default reminder, if any, based on the user profile data received from the user.

3. The computer system of claim 2, the operations of which further comprising allowing the user to configure additional custom reminders for the user or for other recipients associated with the legal entity.

4. The computer system of claim 1, wherein the government form is a tax form and the government entity is a government taxing authority.

5. The computer system of claim 1, wherein the government form is a Statement of Information and the government entity is a Secretary of State office of a state.

6. The computer system of claim 1, wherein the electronic message is an email.

7. The computer system of claim 1, the operations of which further comprising allowing the user to create and manage multiple legal entities under one unique login.

8. A non-transitory machine-readable medium having stored thereon a computer program for generating and sending customized reminders about and for facilitating the timely filing of government forms by a legal entity with a government entity, the computer program comprising instructions for causing the machine to perform the steps of:
creating a database comprising a first administrative data structure accessible only by an administrator and a second user data structure accessible by the administrator and a user;
wherein the first administrative data structure comprises a first portion having updated government form data, the government form data comprising:
an indication of a form type or name for a plurality of government forms;
a first URL to each of the government forms for accessing the official, continually updated version of each of the government forms, the first URL being stored in the database in association with the corresponding type of legal entity required to submit each of the government forms, a due date for submitting each form, and default reminder dates for preparing and submitting each form; and
a second URL to the official, continually updated instructions for completing each of the government forms, the second URL being stored in the database in association with the first URL, wherein the government forms comprise tax-based forms and entity-based forms relating to reporting and filing requirements for legal entities based on the type of legal entity and the state of formation, wherein the due dates for submitting each of the government forms are caused to be stored in the database in association with at least one of a tax year-end date of a legal entity, a formation date of a legal entity, and a formation state of a legal entity;
wherein the second user data structure comprises a second portion comprising user profile data supplied by the user, wherein the user profile data comprises an indication of the type of legal entity of the user, the formation date of the legal entity, or the tax year-end date of the legal entity;
receiving and storing the government form data about each government form;
if the government form's filing due date is static, setting a static default reminder date;
receiving and storing the user profile data;
providing a software module to automatically and periodically check the government form data, and the user profile data, and based thereon, determining if any reminder has to be sent out; and
if a reminder has to be sent out, generating and sending to the user an electronic message reminder that automatically causes the population of a calendar entry in an electronic calendar of the user with the filing due date and with the first URL for the government form and the second URL for the government form's instructions.

9. The non-transitory machine-readable medium of claim 8, wherein the government form is a tax form and the government entity is a government taxing authority.

10. The non-transitory machine-readable medium of claim 8, wherein the government form is a Statement of Information and the government entity is a Secretary of State office of a state.

11. The non-transitory machine-readable medium of claim 8, wherein the electronic message is an email.

12. The non-transitory machine-readable medium of claim 8, the computer program further comprising allowing the user to create and manage multiple legal entities under one unique login.

13. A method for generating and sending customized reminders about and for facilitating the timely filing of government forms by a legal entity with a government entity, the method being operable on a computer system comprising at least a server having a processor, operating system, memory and a computer program for sending customized reminders to users comprising processor-executable instructions stored on a non-transitory processor-readable medium, the method comprising the steps of:
creating a database comprising a first administrative data structure accessible only by an administrator and a second user data structure accessible by the administrator and a user;
wherein the first administrative data structure comprises a first portion having updated government form data, the government form data comprising:
an indication of a form type or name for a plurality of government forms;
a first URL to each of the government forms for accessing the official, continually updated version of each of the government forms, the first URL being stored in the database in association with the corresponding type of legal entity required to submit each of the government forms, a due date for submitting each form, and default reminder dates for submitting each form; and
a second URL to the official, continually updated instructions for completing each of the government forms, the second URL being stored in the database in association with the first URL, wherein the government forms comprise tax-based forms and entity-based forms relating to reporting and filing requirements for legal entities based on the type of legal entity and the state of formation, wherein the due dates for submitting each of the government forms are stored in the database in association with at least one of a tax year-end date of a legal entity, a formation date of a legal entity, and a formation state of a legal entity;
wherein the second user data structure comprises a second portion comprising user profile data supplied by the user, wherein the user profile data comprises an indication of the type of legal entity of the user, the formation date of the legal entity, or the tax year-end date of the legal entity;
receiving and storing government form data from the administrator;
if the government form's filing due date is static, setting a static default reminder date;
receiving and storing user profile data from the user;
providing a software module to automatically and periodically check the government form data, and the user profile data, and based thereon, determining if any reminder has to be sent out; and, if a reminder has to be sent out, generating and sending to the user an electronic message reminder including the filing due date and access to the government form and to the government form's instructions, wherein the access comprises a first link to the updated version of the government form and a second link to the updated version of the government form's instructions.

14. The method of claim 13, further comprising displaying to the user the government form data, the static default reminder date, and data about the formation date default reminder and the tax year-end date default reminder, if any, based on the user profile data received from the user.

15. The method of claim 13, further comprising allowing the user to configure additional custom reminders for the user or for other recipients associated with the legal entity.

16. The method of claim 13, wherein the electronic message is an email and wherein the first and second links connect to attached copies of the government form and of the government form's instructions, respectively.

* * * * *